Oct. 23, 1962　　　　D. COCEANO　　　　3,059,667
HIGH TEMPERATURE CHECK VALVE
Filed April 27, 1960
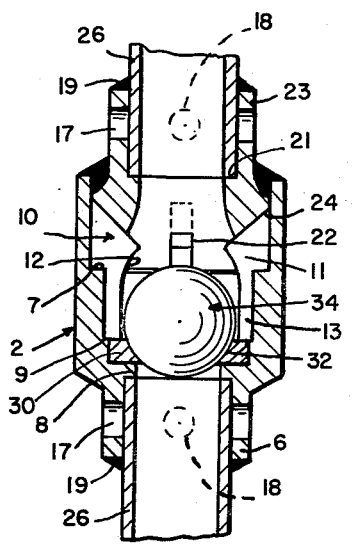
INVENTOR.
DOMENICO COCEANO
BY Wade Lountz
Bruce W. McKed
ATTORNEYS

United States Patent Office

3,059,667
Patented Oct. 23, 1962

3,059,667
HIGH TEMPERATURE CHECK VALVE
Domenico Coceano, Levittown, N.J., assignor to the United States of America as represented by the Secretary of the Air Force
Filed Apr. 27, 1960, Ser. No. 25,174
4 Claims. (Cl. 137—533.13)
(Granted under Title 35, U.S. Code (1952), sec. 266)

The invention described herein may be manufactured and used by or for the United States Government for governmental purposes without payment to me of any royalty thereon.

This invention relates to a check valve and, more particularly, to check valves for use at temperatures in excess of 1200° F. and below −180° F.

Many of the prior check valves have been found to be unsatisfactory when used at high temperatures to control the flow of high temperatures, gases or liquid metals. The problem is solved herein by the selection of chemically inert materials having high melting points built into an efficient structural design.

One of the objects of this invention is to provide a check valve that is particularly suitable for operating at temperatures of 1800° F. with liquid metal passing therethrough.

Another object of this invention is to provide a check valve having a ball and seat that will not fuse when used to control the flow of liquid metals.

Another object of this invention is to provide a check valve comprising a ball and a seat wherein the mating contacting surfaces of the ball and seat will not corrode from the flow of liquid metal at high temperatures therethrough thereby eliminating the problem of leakage through the valve when the ball and seat are engaged in mating relationship.

Another object of this invention is to provide a check valve capable of operating in eutectic sodium potassium mixtures of 1800° F.

A further object of this invention is to provide a check valve that may be used to control the flow of very low temperature liquids or gases and the like such as $O_2$, $H_2$ or $N_2$.

The present invention hereinafter described in more detail teaches the selection of materials for parts that are assembled in a device which will perform satisfactorily in conditions as above outlined.

Other objects of the invention will appear from the detailed description and appended claims when studied in connection with the accompanying drawing.

The single FIGURE of the drawing is a reduced axial sectional view taken longitudinally through the check valve assembly for the purpose of illustrating the same.

Referring to the drawing, it can be seen that like numerals are employed to designate like parts that are duplicated in the assembly. The valve assembly 2 of this invention comprises a ball valve 34 that engages in sealing relation a valve seat 30. The valve assembly housing comprises a lower female housing 6 and into the upper end of which the lower end of an upper male housing 23 is inserted and secured by welding. The valve asembly is cylindrical in external appearance and its opposite ends are apertured and dimensioned to receive therewithin adjacent ends of the two pipes 26. The valve assembly is attached to and is sealed with the adjacent ends of the pipe by weld metal 17 disposed in a desired plurality of holes 18 that are equally spaced around the periphery of the valve ends. In addition to the weld 17 in the holes 18, the pipes 26 are welded around the peripheral edge by weld 19 to both ends of the valve assembly.

The insertion of the opposed ends of the pipe 26 into the opposite ends of the valve asembly is limited by integrally extending flanges 8 and 21, integral with the valve assembly. The ring shaped valve seat 30 preferably is press fitted against the lower flange 8.

When the valve is closed, the ball valve 34 movably engages in sealing relation along a line contact the planar valve seat surface 32. This ball valve engaging surface 32 is inwardly and downwardly tapered around the periphery of the seat an an angle with the vertical axis of approximately 35°. When the valve is opened, the valve ball 34 is removed from its seat against the surface 32.

The valve ball 34 is guided to engage its valve seat surface 32 by a desired plurality of ball guides 10. The ball guides 10 seat in slots 22 in the inner face of the assembly to extend inwardly from the inner surface of the housing of the valve assembly. The ball guides 10 extend axially of the asembly to permit a desired axial movement for the ball valve 34 and then terminate in enlarged sections 11 near their ends remote from the valve seat 30. Shoulders 12 on the inside edge of enlarged portions 11 serve to limit the movement of the ball valve 34 upwardly within the valve body.

The ball guides 10 are maintained in place axially of the assembly by their lower ends 13 engaging the valve seat 30 and shoulder 9 formed in the lower female housing 6 and the upper end engaging the inclined shoulder 24 at the lower end of the upper male housing member 23 and the shoulder 7 in the lower housing 6.

As can be seen from the drawing, the liquid or gas medium that passes through the valve assembly is prevented from coming into contact with the welds since the welds are only in contact with the external surfaces of the pipes 26. It is important to minimize any tendency for hot liquid metals to melt the weld, thereby destroying the seals in the valve.

In selecting the materials for fabricating parts comprising the valve assembly, it is extremely important that materials be selected that can withstand high temperatures associated with the liquid metals as well as low temperatures associated with the liquid gases flowing through the valve asembly. Typical low temperatures are those of oxygen (−189° F.) and hydrogen (−423.4°). Furthermore, the valve asembly should be so designed to prevent leakage through the valve when the mating surfaces of the ball valve and ball seat are in surface-to-surface contact. One instance of leakage in valves of this type is often the result of marring of the ball valve or valve seat mating surfaces due to extended operation of the valve. Therefore, metals of a high degree of hardness are essential for achieving the results intended in the operation of the present valve assembly.

As a preferred embodiment in avoidance of the above described limitations, the ball seat is made of molybdenum and the ball of tungsten carbide. Molybdenum having a melting point of 4800° F. and being exceptionally strong and hard was found to fulfill the necessary mechanical and chemical requirements for use in the present valve assembly. In selecting the material for the ball valve, it is particularly important that a material be selected having a high resistance to wear. The metal tungsten is well known for its high resistance to wear and has an even greater resistance to wear when combined with carbon to form tungsten carbide. The addition of carbide to the metal tungsten increases the hardness of the ball and consequently reduces the possibility of the ball becoming marred from contact with the ball seat.

The metal selected for the lower and upper housings 6 and 23 and ball guide 10 was found not to be as critical as the metal used for the valve seat 30. Therefore, in the preferred embodiment "Inconel X" was selected for its high resistance to corrosion and oxidation and its low cost. "Inconel" is the trademark for an alloy composition that consists of by weight 77% nickel, 15% chromium and 8% iron. "Inconel X" is of the same composition with the further addition of small quantities of aluminum, titanium and cobalt, depending upon the particular qualities desired in the alloy.

As an alternative selection of metals for the valve assembly, the metal alloy titanium carbide may be used for making the valve ball; the valve seat and the lower and upper housing and ball guides may all be made from the alloy "Inconel," if so desired. As with the metal tungsten carbide, titanium is a very hard metal with a very high melting point of 3272° F. and when combined with carbon results in a metal alloy having a greater degree of hardness than the titanium metal in its pure state.

Operation of the valve assembly with the metals of the preferred embodiment has proven that the valve will operate satisfactorily at temperatures of the order of 1800° F. when liquid metals are passed through the valve assembly. Valve assemblies in use prior to the present invention were limited to temperatures below 1200° F. The tungsten carbide by weight consists of approximately 93.5% tungsten and 6.5% carbon whereas the titanium carbide consists of 80% titanium and 20% carbon.

In light of the above description, it is thought that the features and advantages of the invention will be readily apparent to those skilled in the art.

It is to be understood that changes in the form, proportion and minor details of construction may be resorted to without departing from the spirit of the invention and the scope of the appended claims.

I claim:

1. A check valve assembly especially suitable for controlling the flow of fluids at temperatures up to 1800° F., said valve assembly comprising a pair of cylindrical lower and upper housing members for conducting the fluids, said lower housing having a chamber therein, a tungsten carbide ball valve within said chamber and movable from an open position to a closed position, a planar surfaced ball valve line engaged valve seat of molybdenum press fitted within one end of said chamber, said upper housing member integrally positioned within the other end of said chamber and having a plurality of longitudinal slots at the inner end thereof, a plurality of ball guides positioned within said longitudinal slots, said ball guides and valve seat serving to limit travel of said tungsten carbide ball valve, each of said ball guides terminating upwardly in an inclined end edge that is engaged by an inclined shoulder lower end of the upper housing in wedging relation therewith and each ball guide having a leg extending along a portion of the length of the chamber and having a lower end portion abutting the upper surface of the valve seat, said leg having longitudinal edge portions in contacting relation with said ball as it moves from said closed position abutting the valve seat to said open position away from said valve seat.

2. A check valve assembly according to claim 1 wherein the lower and upper housing and ball guides are fabricated from an alloy consisting of by weight of approximately 77% nickel, 15% chromium and 8% iron.

3. A check valve assembly especially suitable for controlling the flow of liquid metals or gases at temperatures up to 1800° F., said valve assembly comprising a lower housing cylindrical in cross section and having a chamber therein, a tungsten carbide ball valve movable within said chamber from a closed position to an open position, a molybdenum valve seat press fitted within one end of said chamber and serving as a line contact planar seat for said ball valve when in a closed position, an upper housing positioned within the other end of said chamber from said valve seat, a plurality of ball guides uniformly displaced longitudinally around the periphery of said chamber to provide guide and limiting means for said ball valve, said upper housing member having a plurality of longitudinal slots about the inner peripheral end thereof for receiving said ball guides in the slots and wedged axially of the assembly, said ball guides each having an enlarged upper end portion and a long slender lower end portion inwardly offset from said upper end portion, said upper end portion seated within one of said slots and being defined by a straight side portion parallel to and in contact with the wall defining said chamber and a side portion bearing against a mating seat in said slot and sloping downwardly and inwardly from said straight portion, said lower end portion of said ball guide having an end in bearing contact with an upper surface of said ball seat and a peripheral shoulder formed in said chamber wall, said peripheral shoulder having an upper surface coplanar with the upper surface of said ball seat, said chamber having an upper shoulder in engagement with a portion of the upper end portion of said ball guide, said mating seat of said slot, said upper shoulder of said chamber, and said chamber wall cooperating to wedge therebetween said ball guides to prevent radial movement of said ball guides, said upper housing, lower housing and valve body, ball guides, being fabricated from an alloy consisting of by weight approximately 77% nickel, 15% chromium and 8% iron.

4. In a ball valve assembly, the combination of: a lower housing and an upper housing, said lower housing having a chamber therein, a ball valve movable within said chamber from a closed position to an open position, a valve seat within one end of said chamber and serving as a line contact planar seat for said ball valve when in a closed position, said upper housing positioned within the other end of said chamber from said valve seat, a plurality of ball guides uniformly displaced longitudinally around the periphery of said chamber to provide guide and limiting means for said ball valve, said upper housing member having a plurality of longitudinal slots about the inner peripheral end thereof for receiving said ball guides in the slots and wedged axially of the assembly, said slots extending to the inner peripheral end of said upper housing, said ball guides each having an enlarged upper end and a long slender lower end portion inwardly offset from said upper end position, said upper end portion seated within one of said slots and being defined by a flat side portion parallel to and in contact with the wall defining said chamber and an opposite side portion bearing against a mating seat in said slot and sloping downwardly and inwardly from said flat portion, said flat portion cooperating with an outwardly facing side of said long slender lower end portion to form a shoulder, said long slender lower end portion having an inwardly facing side connected to said downwardly and inwardly sloping side portion by an arcuate portion, said arcuate portion serving to limit upward movement of said ball valve, said long slender lower end portion of said ball guide having an end in bearing contact with an upper surface of said ball seat and a peripheral shoulder formed in said chamber wall, said upper surface of said peripheral shoulder being coplanar with the upper surface of said ball seat, said chamber having an upper shoulder in mating engagement with said shoulder formed by said flat portion and said outwardly facing side of said long slender lower portion, said seat of said slot, said upper shoulder of said chamber, and said chamber wall cooperating to wedge therebetween said ball guides to prevent radial or circumferential movement of said ball guides.

References Cited in the file of this patent

UNITED STATES PATENTS

| | | |
|---|---|---|
| 1,901,217 | Yerkes et al. | Mar. 14, 1933 |
| 1,915,065 | Malcolm | June 20, 1933 |
| 2,137,402 | Hoferer et al. | Nov. 22, 1938 |
| 2,294,568 | Neilson | Sept. 1, 1942 |
| 2,682,281 | Ecker | June 29, 1954 |
| 2,716,421 | Bertrand | Aug. 30, 1955 |
| 2,841,167 | Jacobson | July 1, 1958 |